United States Patent [19]

Kubo et al.

[11] Patent Number: 4,869,978
[45] Date of Patent: Sep. 26, 1989

[54] CYLINDRICAL ALKALINE BATTERIES

[75] Inventors: Isao Kubo, Kadoma; Toshikazu Kaneko, Hirakata; Hirofumi Iwaki, Daito; Yoji Kajikawa, Katano; Junichi Asaoka, Ikoma; Jun Miyoshi, Hirakata, all of Japan

[73] Assignee: Matsushita Electric Industrial, Co., Ltd., Osaka, Japan

[21] Appl. No.: 234,603

[22] Filed: Aug. 22, 1988

[30] Foreign Application Priority Data

Aug. 28, 1987 [JP] Japan .................. 62-215651
Dec. 28, 1987 [JP] Japan .................. 62-331994
May 11, 1988 [JP] Japan .................. 63-113909

[51] Int. Cl.$^4$ ............................. H01M 2/02
[52] U.S. Cl. ............................. 429/165; 429/185
[58] Field of Search ................ 429/164, 165, 174, 185

[56] References Cited

U.S. PATENT DOCUMENTS 3,694,267  9/1972  Angelovich .
3,740,271  6/1973  Jammet et al. ............ 429/165
4,567,118  1/1986  Connelly .................. 429/185
4,606,983  8/1986  Milewsk et al. ........... 429/164

FOREIGN PATENT DOCUMENTS 2238180  5/1973  Fed. Rep. of Germany .
2321842  1/1974  Fed. Rep. of Germany .
2557455  6/1977  Fed. Rep. of Germany .
2554640  5/1985  France .

OTHER PUBLICATIONS

European Search Report, The Hague.

Primary Examiner—Donald L. Walton
Attorney, Agent, or Firm—Stevens, Davis, Miller & Mosher

[57] ABSTRACT

The present invention provides a cylindrical alkaline battery comprising a positive electrode case of a cylindrical form having an opening at one end and accommodating an electricity-generating element comprising a positive electrode, a negative electrode, a separator and an alkaline electrolytic solution, an insulating gasket provided at the opening of the positive electrode case, a bottom plate being the negative electrode terminal provided on the gasket, and a heat-shrinkable member such as shrink tube or the like covering the outer surface of the positive electrode case. In this battery, the opening end of the positive electrode case and the outer surface of the battery extending therefrom are covered with an electrical insulating film. The presence of the electrical insulating film prevents the exterior short circuit between the positive electrode case and the bottom plate being the negative electrode terminal which may occur when the metal material of the case opening is exposed by the peeling or abnormal shrinkage of the heat-shrinkable member.

The present invention also provides a cylindrical alkaline battery comprising a reinforcing washer provided between the bottom plate being the negative electrode terminal and the gasket. In this battery, electric insulation is established between the bottom plate being the negative electrode terminal and the washer or between the gasket and the washer and the presence or the electric insulation cuts off the possible electric reaction route forming a local cell and prevents the resultant leakage of the electrolytic solution.

16 Claims, 8 Drawing Sheets $$Zn + 4K^+ + 4OH^- \rightleftharpoons 2K^+ + Zn(OH)_4^{--} + 2K^+ + 2e^- \quad \text{-----}(1)$$

$$2H^+ + 2OH^- + 2e^- \rightleftharpoons H_2 + 2OH^- \quad \text{-----}(2)$$

$$Zn + 4K^+ + 4OH^- \rightarrow 2K^+ + Zn(OH)_4^{--} + 2K^+ + 2e^- \quad \cdots (1)$$

$$2H^+ + 2OH^- + 2e^- \rightarrow H_2 + 2OH^- \quad \cdots (2)$$

CYLINDRICAL ALKALINE BATTERIES

The present invention relates to a cylindrical alkaline battery comprising an uncovered battery body and a heat-shrinkable cover member such as shrink label, shrink tube or the like. More particularly, the present invention relates to a cylindrical alkaline battery comprising an uncovered battery body and a heat-shrinkable cover member, which is prevented from an exterior short circuit caused by the contact between the positive electrode case and the bottom plate being the negative electrode terminal via a third electroconductive material, and further possesses improved leakage resistance.

In alkaline batteries, in order that the cover to have a simplified structure and thereby to allow the metallic battery case accommodating an electricity-generating element to have a larger diameter, the metallic battery case accommodating an electricity-generating element and functioning as the positive electrode terminal has been covered and insulated with a shrink label or tube having metal deposition at one side. This arrangement, when compared with a metallic battery case covered with a metallic can, enables the accommodation of a larger amount of an electricity-generating element inside the battery case, and provides a larger battery capacity. In the label-covered batteries, the shrink label adheres to the outer surface of the battery case with an adhesive, and the projected portions of the label at the top and bottom ends of the case are subjected to shrinkage, however, there occur in some cases the peeling of the label at its ends due to deterioration of the adhesive or friction applied during transfer or storage of the battery.

For the tube-covered batteries wherein a battery case is inserted into a cylindrical shrink tube and the tube is heat-shrunk, there occurs at times during high temperature storage of the battery further heat shrinkage of the upper and lower ends of the shrunk tube leading to an increase in the extent of exposure of the top and bottom ends of the battery case and reduced strength of the cover. In these label- or tube-covered batteries, besides the above-mentioned peeling or abnormal shrinkage of the label or tube in the vicinity of the opening of the battery case, there tends to occur the damage (e.g. peeling, cutting) of the label or tube by contacting with terminals of an electric apparatus using such a battery, at the time of insertion or taking-out of the battery into or from the apparatus. Therefore, there tends to occur an exterior short circuit between the caulked portion of the positive electrode case and the bottom plate being the negative electrode terminal which are both metallic and are located nearly each other, when the battery is inserted into an electric apparatus or is placed on a metal plate with the positive electrode terminal directed upward, whereby the rupture of the battery or leakage is induced.

Generally in alkaline batteries covered with a heat-shrinkable member, it is necessary to provide an exhaust port on the bottom plate being the negative electrode terminal to enable discharging out a gas generated inside of the battery with a tiny explosion-proof mechanism having a thin nylon gasket breakable under increase in the internal pressure of the battery. In such alkaline batteries, when the sealing strength of the sealing gasket is weak, leakage of the electrolytic solution tends to occur along the sealing gasket during storage of the battery, because the caustic potash electrolytic solution used in alkaline batteries has highly creeping property. Hence, in order to obtain an alkaline battery of increased leakage resistance, there is generally adopted such a sealing structure as providing a metallic washer between the gasket and the bottom plate being the negative electrode terminal to increase sealing strength for the sealing gasket.

In an alkaline battery having such a sealing structure, however, potassium ion ($K^+$) permeates the nylon gasket according to the mechanism described later when the battery is stored under highly humid conditions (e.g. 90% relative humidity and 60° C.); therefore, severe leakage appears when the battery is stored under highly humid conditions over a long period of time such as one month or longer.

The reason is that when the above alkaline battery is stored under highly humid conditions, moisture in the atmosphere penetrates into the battery through the exhaust port on the bottom plate being the negative electrode terminal, reaches the space between the metallic washer and the nylon gasket, and causes dew condensation and as the result, interface between the metallic washer and the nylon gasket is wetted by water and the gasket turns to a hydrous nylon, thereby an electrochemical reaction route is formed.

The reaction mechanism is as follows. On the surface of the zinc present in the aqueous caustic potash solution, there occurs a zinc dissolution reaction represented by the following formula (1).

$$Zn + 4K^+ + 4OH^- \rightarrow 2K^+ + Zn(OH)_4^{--} + 2K^+ + 2e^- \quad (1)$$

On the water-wetted surface of the iron constituting the metallic washer which is electrically connected to the zinc via the bottom plate being the negative electrode terminal, there occurs a hydrogen formation reaction represented by the following formula (2).

$$2H^+ + 2OH^- + 2e^- \rightarrow H_2 + 2OH^- \quad (2)$$

Concurrently with the above reactions, the hydrous nylon acts as a diaphragm through which $K^+$ migrates, and water present on the iron surface is gradually converted into an aqueous caustic potash solution ($K^+ + OH^-$), to turn finally the solution to highly alkaline. The thus formed alkaline solution leaks out through the exhaust port on the bottom plate being the negative electrode terminal, thus causing severe leakage.

As mentioned above, conventional alkaline batteries covered with a heat-shrinkable member have various problems to be solved with respect to the reliability of cover, safety of battery and leakage.

It is an object of the present invention to provide a cylindrical alkaline battery with improved cover reliability, because conventional alkaline batteries covered with a heat-shrinkage member such as shrink label or shrink tube are inferior to metal-covered batteries in the cover reliability.

It is another object of the present invention to provide means for cutting off the above-mentioned electrochemical reaction route resulting in the increased leakage resistance of cylindrical alkaline batteries.

One means to achieve the first object comprises forming an electric insulating film on at least the opening end and opening outer surface of the battery metallic case accommodating an electricity-generating element and sealed with an electric insulating gasket at the opening, and covering the case with a heat-shrinkable member.

Another means to achieve the first object comprises providing an insulating ring on the outer surface of the caulked opening portion of the positive electrode case to allow the battery to secure insulation even when the shrunk label or tube has been peeled or damaged in the vicinity of the caulked opening portion of the positive electrode case.

A further means to achieve the first object comprises providing an insulating ring on the outer surface of the heat-shrinkable cover member at the caulked opening portion of the positive electrode case to prevent the shrunk label or tube from being peeled or damaged.

Each of the above means can solve the problems of the exterior short circuit between the positive and negative electrodes which has been prevailing in conventional shrink label- or shrink tube-covered alkaline batteries.

Means to achieve the second object in the constitution of a cylindrical alkaline battery having a washer between the nylon gasket sealing the opening of the positive electrode case and the bottom plate being the negative electrode terminal, comprises (a) employing the bottom plate being the negative electrode terminal treated to be electric insulating on at least one side contacting with the metallic washer, or (b) employing the metallic washer treated to be electric insulating on at least one side contacting with the bottom plate being the negative electrode terminal, or (c) employing the metallic washer treated to be electric insulating on at least one side contacting with the nylon gasket, or (d) employing an electric insulating washer, or (e) employing the nylon washer treated to be electric insulating on at least one side contacting with the metallic washer, or (f) installing an insulator between the bottom plate being the negative electrode terminal and the metallic washer, or (g) installing an insulator between the metallic washer and the nylon gasket.

Figure 5:
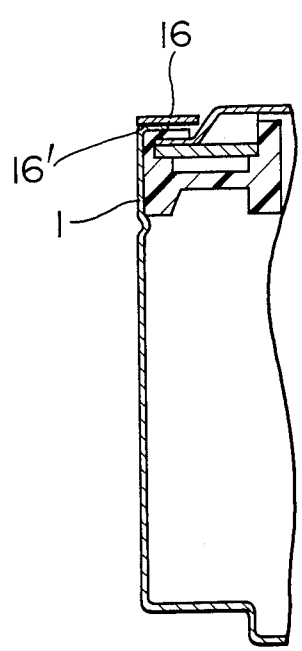
Figure 6:
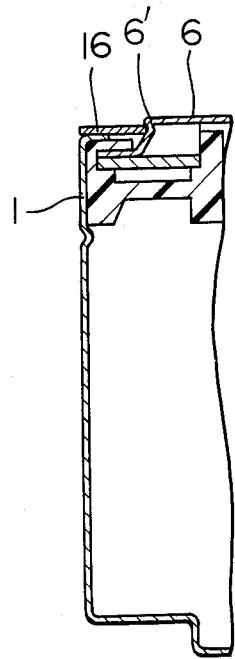
Figure 7:
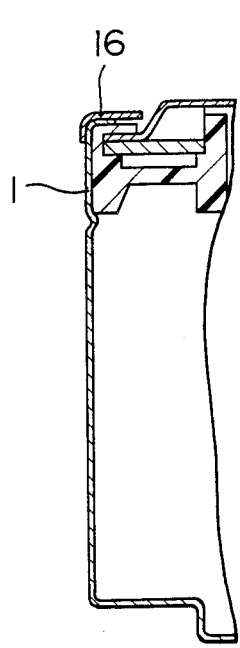
Figure 8:
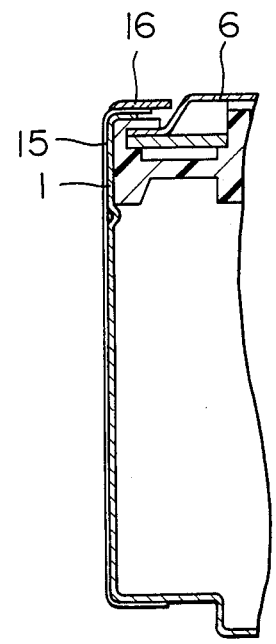
Figure 9:
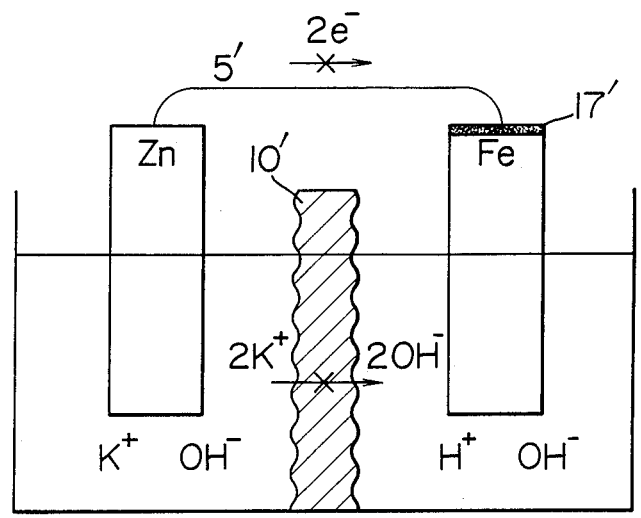
Figure 10:
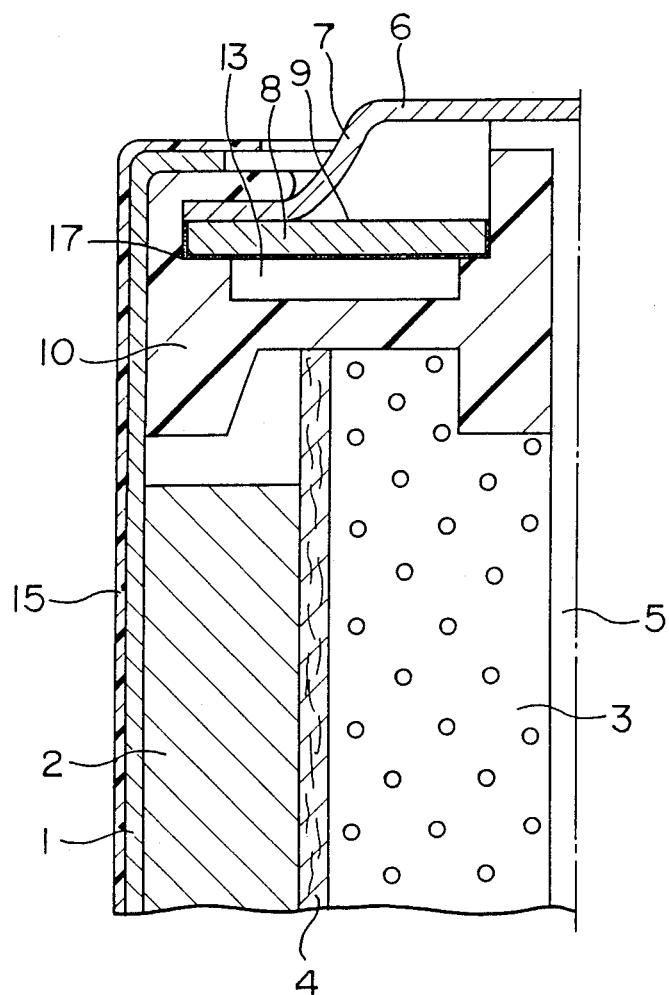
Figure 11:
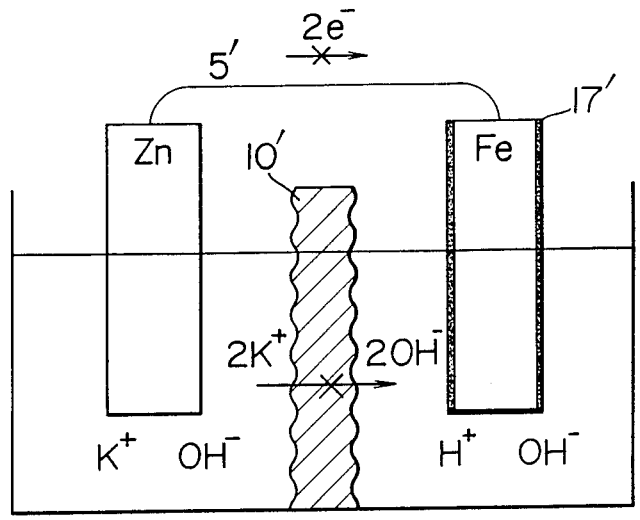

FIGS. 5, 6 and 7 each is a partial sectional view of a cylindrical alkaline battery for a still further embodiment of the present invention;

FIG. 8 is a partial sectional view of a cylindrical alkaline battery for the third embodiment of the present invention;

FIG. 9 is a drawing showing schematically electrochemical reaction for the fourth embodiment of the present invention;

FIG. 10 is an enlarged sectional view showing the sealed portion of a cylindrical alkaline battery for the fifth embodiment of the present invention; and FIG. 11 is a drawing showing schematically electrochemical reaction for the fifth embodiment of the present invention.

Figure 1:
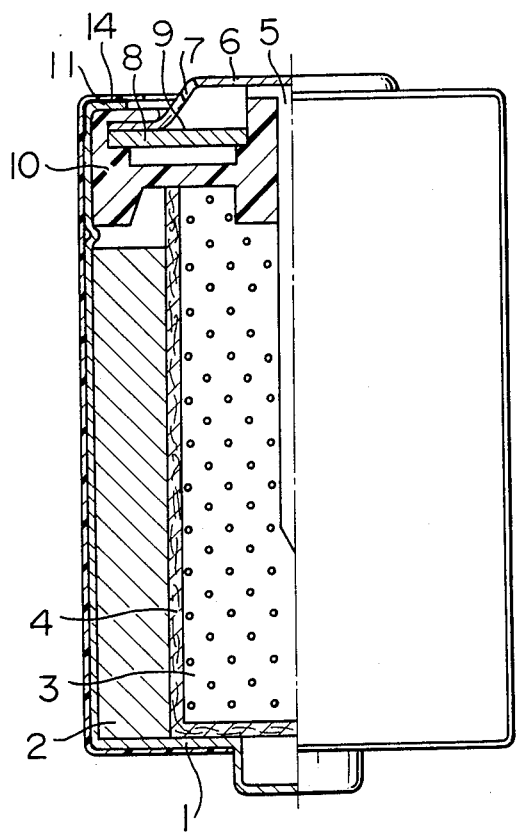
FIG. 1 is a view of a cylindrical alkaline battery for the first embodiment of the present invention (partical sectional view of the left half)
Figure 2:
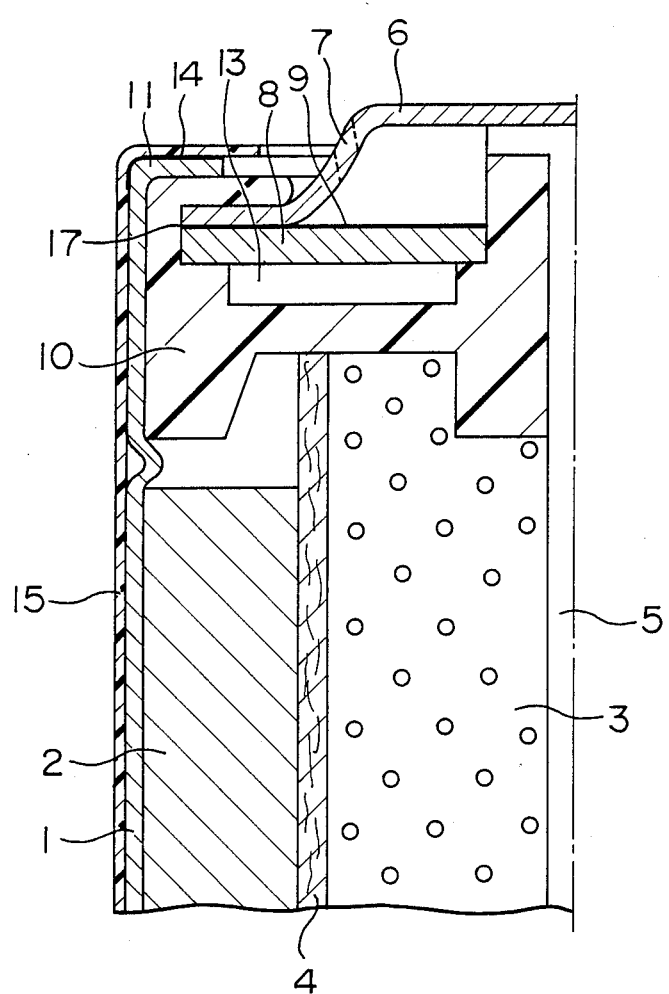
FIG. 2 is an enlarged sectional view showing the sealed portion of the battery in FIG. 1.
Figure 3:
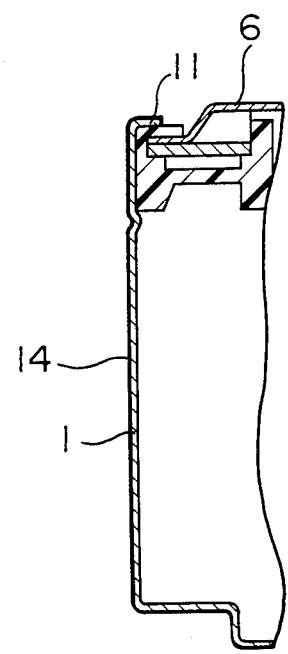
FIG. 3 is a partial sectional view of a cylindrical alkaline battery for another embodiment of the present invention.

The embodiments of the present invention are explained in detail referring to the accompanying drawings. In FIG. 1, 1 is a metallic battery case functioning as a positive electrode terminal, which contains a positive electrode mix 2 composed mainly of $MnO_2$ and molded into a cylindrical shape, a bag-shaped separator 4 and a gel-like zinc negative electrode 3. Symbol 5 is a negative electrode collector. The bottom plate 6 acting as a negative electrode terminal is spot-welded to the end of the negative electrode collector 5 and has an exhaust port 7. This bottom plate 6 is held by caulking the opening 11 of the battery case inwardly and tightening through a nylon gasket 10 the bottom plate 6 together with a metallic washer 8 provided between the bottom plate 6 and the nylon gasket 10. As shown in FIG. 2, at least the opening end 11 and the opening outer surface of the battery case 1 are covered with an electric insulating film 14 of ring shape. As shown in FIG. 3, the electric insulating film 14 may cover the entire outer surface of the battery case 1 from the caulked opening portion to the bottom end of the cylinder. Thereon, a shrink label or shrink tube 15 is applied as a cover. In such a structure, since the opening of the case is covered with the electric insulating film 14, good electric insulation can be maintained between the positive electrode case and the metallic bottom plate being the negative electrode terminal even when a portion of the label or tube covering the opening of the case undergoes peeling or damage due to deterioration during storage or friction, and this can prevent the rupture of the positive electrode case or the leakage of electrolytic solution which is induced by an exterior short circuit due to contact of a third electroconductive material with both of the positive electrode case and the bottom plate being the negative electrode terminal. Incidentally, the electric insulating film 14 can be formed by, after caulking the opening 11 of the battery case 1 and sealing the opening 11 with the gasket, applying a synthetic resin coating (e.g. phenolic resin coating, epoxy resin coating) to the outer surface of the caulked portion of the battery case 1 and then drying the coating.

Thus, the battery of the present invention wherein an electric insulating film 14 is formed on at least the opening end and the opening outer surface of the positive electrode case and then a heat-shrinkable member is applied as the cover, not only solves problems of conventional alkaline batteries having only a resin film cover but also can prevent an exterior short circuit and provide the increased reliability. Therefore, the battery has a very high value.

In the present invention, it is possible to form an electric insulating film by applying and curing, in place of a synthetic resin coating requiring a long drying time, a ultraviolet-curable resin composed mainly of, for example, an epoxy acrylate or an aromatic monoacrylate curable in a short time by ultraviolet irradiation. That is, a synthetic resin coating requires about 30 minutes for drying and formation of film, however, a ultraviolet-curable resin can provide a cured film by ultraviolet irradiation of only about 3 seconds and can give substantially increased work efficiency.

Figure 4:
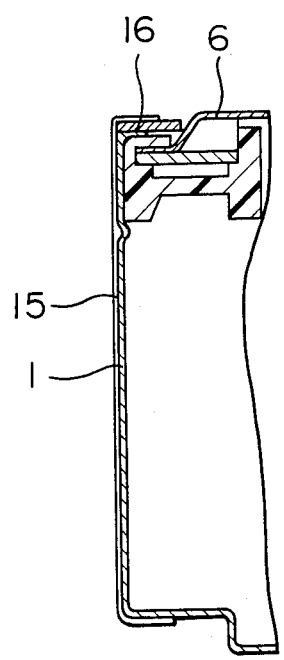
FIG. 4 is a partial sectional view of a cylindrical alkaline battery for a further embodiment of the present invention.

In the present invention, as another means to prevent exterior short circuit, an insulating ring 16 is fixed onto he outer surface of the caulked opening portion of the positive electrode case, as shown in FIG. 4, in place of the electric insulating film provided on the opening end and the opening outer surface of the positive electrode case. Thereafter, the entire outer surface of the sealed positive electrode case is covered with a shrink label or shrink tube 15. The presence of this insulating ring 16 can maintain good insulation between the positive electrode case and the metallic bottom plate being the negative electrode terminal even when the film or tube undergoes peeling or damage, and can prevent the rupture of the positive electrode case or the leakage of electrolytic solution caused by exterior short circuit. Incidentally, the insulating ring 16 can be fixed according to, for example, a method as shown in FIG. 5 wherein, after the positive electrode case 1 has been caulked at the opening and sealed, an adhesive 16' of solution type, aqueous dispersion type, hot melt type, reactive type or the like is applied onto the outer surface of the caulked portion of the positive electrode case 1, and then an insulating ring 16 is adhered thereon, or according to a method as shown in FIG. 6 wherein a lobe 6' is provided at the outer surface of the bottom plate 6 being the negative electrode terminal and an insulating ring 16 is fixed below the lobe 6', or according to a method as shown in FIG. 7 wherein an insulating ring 16 in the shape of a bottom-less cup is fixed onto the outer surface of the caulked portion of the positive electrode case 1.

Thus, the battery of the present invention wherein an insulating ring is fixed onto at least the outer surface of the caulked portion of the positive electrode case and a resin film cover or a resin tube cover is applied thereafter, solves problems of conventional alkaline batteries having only a resin film cover and can prevent exterior short circuit and provide increased reliability.

In the present invention, as a further means to prevent an exterior short circuit, an insulating ring 16 may be fixed onto the outer surface of the cover film 15 at the caulked portion of the positive electrode case 1 after the cover film 15 consisting of a shrink label or shrink tube has been applied on the entire outer surface of the sealed positive electrode case 1, as shown in FIG. 8. The presence of this insulating ring 16 can prevent the peeling or damage of the cover label or cover tube at the battery bottom, can maintain good electric insulation between the positive electrode case 1 and the metallic bottom plate 6 being the negative electrode terminal, and can sufficiently prevent exterior short circuit. Incidentally, the insulating ring 16 can be fixed, for example, by ultrasonic-bonding of an insulating ring 16 to the cover film 15 at the caulked portion of the positive electrode case 1 or by adhering an insulating ring 16 to the cover film 15 at the caulked portion of the positive electrode case 1 with an adhesive of solution type, aqueous dispersion type, reactive type or the like.

Thus, the battery of the present invention wherein an insulating ring is fixed onto the outer surface of the cover film at the caulked opening portion of the positive electrode case, solves the problem of conventional alkaline batteries having only a resin film cover, prevents exterior short circuit and provides increased reliability.

Next, the fourth embodiment of the present invention for preventing the leakage phenomenon caused by the above-mentioned electrochemical reaction is illustrated referring to the drawings. FIG. 2 is an enlarged sectional view of the sealed portion of a cylindrical alkaline battery of the present invention. In FIG. 2, 17 is an insulating film applied onto the upper surface of the metallic washer 8 and characterizes the present embodiment. The constituting elements of this battery excluding the insulating film 17 are same as those of the battery of FIG. 1. This insulating film 17 insulates electrically the metallic washer 8 from the bottom plate 6 being the negative electrode terminal.

In the present embodiment, since the bottom plate 6 being the negative electrode terminal and the metallic washer 8 are electrically insulated from each other by the insulating film 17 applied onto the metallic washer 8, no leakage occurs, for example, even moisture reaches the space 13 between the nylon gasket 10 and the metallic washer 8, and the interface between them is wetted by water, when the battery is stored under highly humid condition. The mechanism for this electrochemical reaction is explained in FIG. 9 which illustrates a schematic case of the electrochemical reaction. In FIG. 9, 17' is an insulating film corresponding to the insulating film 17 of FIG. 2. In FIG. 9, since Zn and Fe are insulated electrically, any of the reactions of the formulae (1) and (2) do not proceed; there occurs no movement of $K^+$ into the water which wets the iron washer; accordingly, the water does not become alkaline. Thus, according to the fourth embodiment of the present invention, the application of the insulating film 17 onto the upper surface of the metallic washer 8 can prevent leakage even when the battery has been stored under highly humid conditions.

FIG. 10 is an enlarged sectional view of the sealed opening portion of a cylindrical alkaline battery (drawn in the form of an uncovered battery) as the fifth embodiment of the present invention. In FIG. 10, 17 is an insulating film applied onto the lower surface and both ends of the metallic washer 8. The constituting elements of this battery excluding the insulating film 17 are same as those of the battery of FIG. 1. This film 17 cuts off the ionic conduction between the metallic washer 8 and the hydrous nylon gasket 10.

In the present embodiment, since the ionic conduction between the metallic washer 8 and the hydrous nylon gasket 10 is cut off by the insulating film 17 applied onto the lower surface and both ends of the metallic washer 8, no leakage occurs, for example, even when the battery is stored under highly humid conditions and moisture reaches the space 13 between the nylon gasket 10 and the metallic washer 8. The mechanism for this electrochemical reaction is explained in FIG. 11 which illustrates a schematic case of the electrochemical reaction. In FIG. 11, 17' is an insulating film corresponding to the insulating film 17 of FIG. 10. In FIG. 11, since any portion of Fe is not in direct contact with water, the $H_2$ formation reaction represented by the formula (2) does not take place on the Fe surface, and accordingly, the reaction of the formula (1) does not take place, either; there occurs no movement of $K^+$ into the water which wets the washer; consequently, the water does not become alkaline. Thus, according to the fifth embodiment of the present invention illustrated in FIG. 10, the application of the insulating film 17 onto the lower surface and two ends of the metallic washer 8 can prevent leakage even when the battery has been stored under highly humid conditions.

As is understood from the above embodiments of the present invention, in a cylindrical alkaline battery wherein a washer 8 is provided between the nylon gasket 10 and the bottom plate 6 being the negative electrode terminal each acting as a sealant for the opening of the positive electrode case 1, leakage occurring when the battery has been stored under highly humid conditions can be prevented by insulating the bottom plate 6 being the negative electrode terminal and the metallic washer 8 by (1) applying an insulating film onto the metallic washer 8, (2) placing a ring-shaped insulating washer between them, or (3) using an electric insulation as the metallic washer 8, or by electrically or ion-conductively insulating the metallic washer 8 and the nylon gasket 10 by placing a chlorosulfonated polyethylene film between them. As a result, excellent cylindrical alkaline batteries can be provided. Table 1 shows the results of leakage resistance when alkaline batteries meeting the IEC standard, LR 6 were stored under conditions of 60° C. and 90% relative humidity. As is clear from Table 1, the alkaline batteries of the fourth and fifth embodiments and the above-mentioned other embodiment of the present invention, as compared with a conventional alkaline battery of same size, show remarkably improved leakage resistance.

TABLE 1

| Run No. | Storage period, days | | | | |
| --- | --- | --- | --- | --- | --- |
|  | 7 | 14 | 21 | 28 | 56 |
| 1 (fourth embodiment) | 0 | 0 | 0 | 0 | 0 |
| 2 (fifth embodiment) | 0 | 0 | 0 | 0 | 0 |
| 3 (other embodiment) | 0 | 0 | 0 | 0 | 0 |
| 4 (conventional battery) | 0 | 5 | 50 | 90 | 100 |

We claim:

1. A cylindrical alkaline battery comprising
a positive electrode case of a cylindrical form having an opening at one end and accommodating an electricity-generating element composed of a positive electrode, a negative electrode, a separator and an alkaline electrolytic solution,
a gasket made of an electric insulating synthetic resin and installed at the opening of the positive electrode case,
a bottom plate being the negative electrode terminal electrically connected to the negative electrode in the electricity-generating element and installed on the gasket, and
a heat-shrinkable resin member covering the outer surface of the positive electrode case, wherein the opening of the positive electrode case is sealed by caulking the opening end inwardly and thereby tightening the bottom plate being the negative electrode terminal through the gasket, and wherein an electric insulating film is formed on at least the opening end of the positive electrode case and the outer surface of caulked portion of the positive electrode case adjacent to the opening end.

2. The cylindrical alkaline battery according to claim 1, wherein the electric insulating film is made of a ultraviolet-curable resin.

3. The cylindrical alkaline battery according to claim 1, wherein the electric insulating film is formed continuously from the opening end of the positive electrode case to the other end on the outer surface of the positive electrode case.

4. The cylindrical alkaline battery according to claim 1, wherein a metallic washer is provided between the synthetic resin gasket and the bottom plate being the negative electrode terminal.

5. A cylindrical alkaline battery comprising
a positive electrode case of a cylindrical form having an opening at one end and accommodating an electricity-generating element composed of a positive electrode, a negative electrode, a separator and an alkaline electrolytic solution,
a gasket made of an electric insulating synthetic resin and installed at the opening of the positive electrode case,
a bottom plate being the negative electrode terminal electrically connected to the negative electrode in the electricity-generating element and installed on the gasket, and
a heat-shrinkable member covering the outer surface of the positive electrode case, wherein the opening of the positive electrode case is sealed by caulking the opening end inwardly and thereby tightening the bottom plate being the negative electrode terminal through the gasket, and wherein an insulating ring is provided at the caulked opening portion of the positive electrode case and inside or outside of the heat-shrinkable resin member.

6. The cylindrical alkaline battery according to claim 5, wherein a metallic washer is provided between the synthetic resin gasket and the bottom plate being the negative electrode terminal.

7. The cylindrical alkaline battery according to claim 5, wherein the insulating ring is provided outside of the heat-shrinkable resin member and is adhered thereto.

8. The cylindrical alkaline battery according to claim 5, wherein the insulating ring is provided outside of the heat shrinkable resin member and is fixed onto the bottom plate being the negative electrode terminal at a portion below a lobe on the bottom plate.

9. The cylindrical alkaline battery according to claim 5, wherein the insulating ring is provided outside of the heat-shrinkable resin member and is fixed onto the outer surface of the positive electrode case in a form of a bottomless cup.

10. The cylindrical alkaline battery according to claim 5, wherein the insulating ring is provided outside the heat-shrinkable resin member and is adhered thereto by ultrasonic bonding.

11. A cylindrical alkaline battery comprising
a positive electrode case of a cylindrical form having an opening at one end and accommodating an electricity-generating element composed of a positive electrode, a negative electrode, a separator and an alkaline electrolytic solution,
a gasket made of an electric insulating synthetic resin and installed at the opening of the positive electrode case,
a bottom plate being the negative electrode terminal electrically connected to the negative electrode in the electricity-generating element and installed on the gasket,
a reinforcing washer provided between the bottom plate being the negative electrode terminal and the gasket, and
a heat-shrinkable resin member covering the outer surface of the positive electrode case, wherein the opening of the positive electrode case is sealed by caulking the opening end inwardly and thereby tightening the bottom plate being the negative electrode terminal and the washer through the gasket, and wherein electric insulation is established between the bottom plate being the negative electrode terminal and the washer or between the gasket and the washer.

12. The cylindrical alkaline battery according to claim 11, wherein the reinforcing washer is a metallic washer covered with insulation at least at the upper surface.

13. The cylindrical alkaline battery according to claim 11, wherein the reinforcing washer is covered with insulation at the lower surface and the both side ends.

14. The cylindrical alkaline battery according to claim 11, wherein the reinforcing washer is an electric insulator.

15. The cylindrical alkaline battery according to claim 11, wherein the electric insulation between the bottom plate being the negative electrode terminal and the metallic washer is provided by ring-shaped insulator.

16. The cylindrical alkaline battery according to claim 11, wherein the electric insulation between the insulating gasket and the metallic washer is provided by a coating film of chlorosulfonated polyethylene.

* * * * *